May 30, 1967   G. J. WOODS   3,323,068
ELECTROCARDIOGRAM SIMULATOR
Filed Jan. 21, 1963   3 Sheets-Sheet 1

INVENTOR.
GARY WOODS
BY
G. D. O'Brien
W. H. King
ATTORNEYS

May 30, 1967   G. J. WOODS   3,323,068
ELECTROCARDIOGRAM SIMULATOR
Filed Jan. 21, 1963   3 Sheets-Sheet 3

INVENTOR.
GARY J. WOODS
BY
G. D. O'Brien
W. H. King
ATTORNEYS

3,323,068
ELECTROCARDIOGRAM SIMULATOR
Gary J. Woods, 355 Dickens Ave., Indian River City,
Fla. 32780
Filed Jan. 21, 1963, Ser. No. 253,010
12 Claims. (Cl. 328—187)

The invention described herein may be manufactured and used by or for the Government of the United States of America for governmental purposes without the payment of any royalties thereon or therefor.

The invention relates generally to an improved electrocardiogram (EKG) simulator, and more particularly to an electronic simulator which generates EKG wave forms of the human or animal heart.

When it is necessary to set up or trouble-shoot EKG analysis equipment, either a human subject or a wave which simulates the actions of the human or animal heart must be used. The use of a standard, idealized EKG wave which simulates heart actions is preferred to the use of a human subject since a human subject introduces many variables such as electrode contact, body impedance, heart condition, and varying rate—all of which are misleading and might possibly lead to the belief of hardware malfunction.

A standard, idealized EKG wave is shown by FIG. 1. The EKG wave is a composite of waves P, Q, R, S, T, and U. The portion of the EKG wave between the beginning of P wave and the beginning of the R wave is called the P-R interval; the portion of the EKG wave between the beginning of the R wave and the beginning of the T wave is called the R-T interval; the portion of the EKG wave between the beginning of the Q wave and the end of the S wave is called the QRS complex; and the portion of the EKG wave between the beginning of the T wave and the beginning of the U wave is called the T-U interval.

EKG simulators are now on the market which produce a fair quality EKG wave by mechanical means. However, these mechanical EKG simulators do not produce Q and S negative waves of a quality necessary for the suitable simulation of a QRS complex.

Mechanical simulators have many other disadvantages: their repetition rates are difficult to keep constant; their repetition rates are difficult to vary over the necessary ranges; their wave form qualities are degraded by contact bounce and noise generation; and their life expectancies before maintenance is required are short.

The general purpose of the present invention is to provide an improved EKG simulator which embraces all the advantages of similarly employed EKG simulators and which offers advantages that have not been heretofore found in EKG simulators. The invention is a solid state device using no gaseous-filled tubes, relay switching, or motor-driven cams. As a result, the device should have an extremely long life with a minimum of maintenance. The output impedance of the device is easily changed to match any given set of conditions; i.e., body impedance or input impedance of analysis equipment for maximum power or voltage transfer. All wave and interval times, and all wave amplitudes produced at the output of the device are independently and continuously variable.

The term "continuously variable," used in the preceding paragraph and used throughout this specification and claims, means that any value output within the output range of a device can be produced at the output of the device. For example, if it is said that a pulse generator has af requency of 50–140 pulses per minute and is continuously variable it is meant that the output frequency of the pulse generator can be varied to produce any frequency between 50 and 140 pulses per minute.

It is an object of this invention to provide an electronic electrocardiogram simulator which faithfully generates an ideal EKG wave form.

Another object of this invention is to provide an electronic electrocardiogram simulator which can be maintained at a constant repetition rate and which has a repetition rate that is continuously variable over the entire range of the simulator.

A further object of this invention is to provide an electronic electrocardiogram simulator which will produce Q and S negative waves of a quality necessary for the suitable simulation of a QRS complex.

A still further object of this invention is to provide an electronic electrocardiogram simulator in which all amplitudes of individual waves, all interval times, and all wave duration times are independently and continuously variable.

In accordance with the invention, a master pulse generator generates pulses the frequency of which is the repetition rate of the EKG simulator. Each pulse from the master pulse generator causes P wave, R wave, Q-S wave, T wave, and U wave generators each to generate pulses at times corresponding to the times of the P, R, Q, S, T, and U waves of a standard, idealized EKG wave. These pulses are shaped and added together to form a composite EKG wave.

The novel features of this invention as well as the invention itself, both as to its organization and method of operation, will best be understood from the following description, when read in connection with the accompanying drawings, in which.

Figure 2:
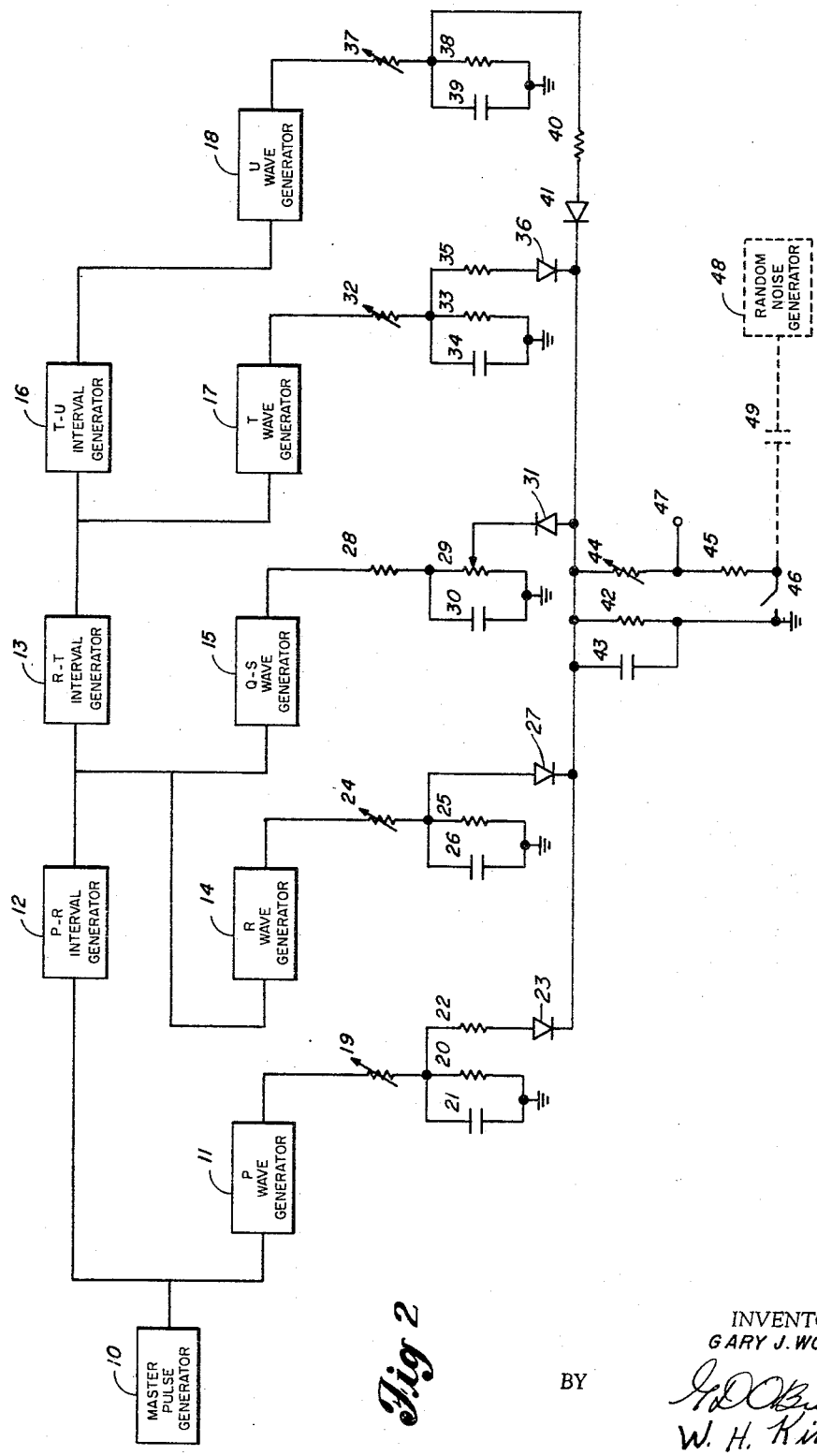
FIG. 2 is a combination block and schematic diagram of an EKG simulator incorporating the invention.
Figure 3:
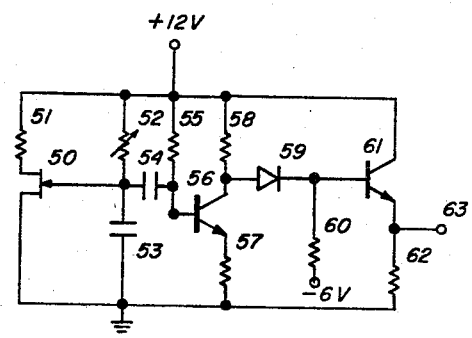
FIG. 3 is a schematic diagram of the master pulse generator shown in FIG. 2.

Referring now to FIG. 2 there is shown a master pulse generator (MPG) 10 which generates the pulses that determine the repetition rate of the generated EKG waves. The MPG 10 produces positive pulses, which have 8 milliseconds duration, at a frequency of from 50 to 140 pulses per minute. The frequency of MPG 10 is continuously variable between 50 and 140 pulses per minute. That is, any frequency between 50 and 140 pulses per minute can be selected to be the output of MPG 10. A schematic diagram of MGP 10 is shown by FIG. 3 which will be described below.

Any pulse generated by MPG 10 is applied to two triggered multivibrators: a P wave generator 11, and a P-R interval generator 12.

Figure 4A:
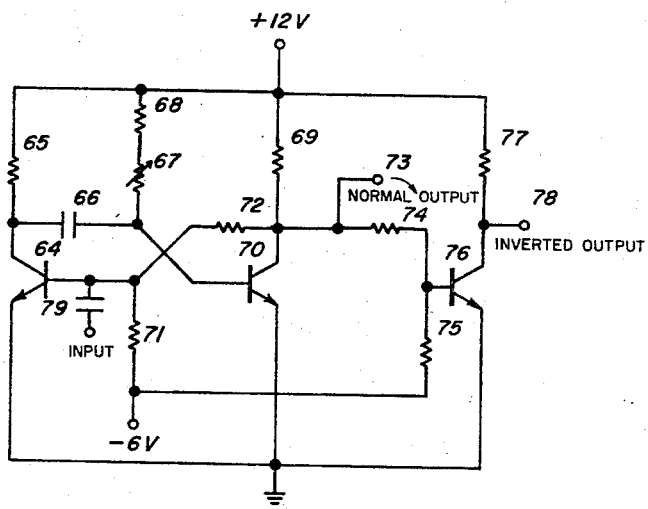
FIGS. 4a and 4b are schematic diagrams of the P-R interval, the R-T interval, the T-U interval, the P wave, the R wave, the Q-S wave, the T wave, and the U wave generators shown in FIG. 2.

When this pulse is applied from MPG 10 to P wave generator 11 it produces a positive pulse which is initiated at the beginning of the pulse from MPG 10. The duration of this pulse is in the range of 30 to 90 milliseconds and is continuously variable within this range. That is, this pulse can, by adjustment in P wave generator 11, be made any duration between 30 and 90 milliseconds. A schematic diagram of P wave generator 11 is shown by FIG. 4a which will be described below.

The output pulse from P wave generator is applied through a variable resistor 19 to a shaping circuit consisting of a shaping capacitor 21 and a resistor 20 connected in parallel between variable resistor 19 and ground. This shaping circuit rounds off the corners of the pulse applied to it to make the pulse more nearly like the P wave shown in FIG. 1. Since resistor 19 is variable, it can be used to control the amplitude of the output from the shaping circuit. The output pulse from this shaping circuit is applied through resistor 22 and diode 23 to another shaping circuit consisting of a shaping capacitor 43 and a resistor 42 connected in parallel between diode 23 and ground. The output of this shaping circuit appears across resistor 42 which is applied to a voltage divider consisting of a variable resistor 44 and a resistor 45. Resistor 45 is connected through switch 46, which is normally closed, to ground. An output terminal 47 is connected between resistors 44 and 45. The amplitude of the pulse appearing at output terminal 47 is controlled by variable resistor 44. The output at terminal 47 due to the pulse produced by P wave generator 11 is the P wave shown by FIG. 1.

Figure 4B:
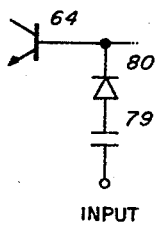

The P-R interval generator 12 is triggered by the same pulse from MPG 10 that triggers P wave generator 11. When P-R interval generator 12 is triggered it produces a negative going pulse which is initiated at the beginning of the pulse from MPG 10. The duration of the pulse produced by P-R interval generator 12 is in the range of 135 to 265 milliseconds and is continuously variable within this range. That is, this pulse can, by adjustments in P-R interval generator 12, be made any duration between 135 and 265 milliseconds. The circuitry used for P-R interval generator 12 is shown in FIGS. 4a and 4b which will be described below. At the end of the negative going pulse produced by P-R interval generator 12, the resulting positive rising voltage will trigger and R wave generator 14, a Q-S wave generator 15, and an R-T interval generator 13.

The R wave generator 14 produces a positive pulse the duration of which is continuously variable between 30 and 60 milliseconds. The circuitry for R wave generator 14 is shown in 4a. The pulse produced by R wave generator 14 is applied through a variable resistor 24 to a shaping circuit network consisting of a shaping capacitor 26 and resistors 24 and 25 connected in parallel between variable resistor 24 and ground. This shaping circuit rounds off the corners of the pulse produced by R wave generator 14 to make it similar to the R wave shown in FIG. 1. Variable resistor 24 is used to control the amplitude of the output from the shaping circuit. This output is applied through diode 27, to the shaping circuit consisting of shaping capacitor 43 and resistor 42.

The Q-S wave generator 15 produces a negative going pulse the duration of which is continuously variable between 40 and 80 milliseconds. The circuitry for the Q-S wave generator is shown in FIG. 4a. The transistors used in the Q-S wave generator 15 have a higher gain and a faster switching time than the transistors used in the R wave generator 14 so that Q-S wave generator 15 triggers at a time slightly before R wave generator 14 triggers. This guarantees the Q portion of the QRS complex. The output of the Q-S wave generator 15 is applied through resistor 28 to a shaping circuit consisting of shaping capacitor 30 and potentiometer 29 connected in parallel between resistor 28 and ground. The shaping capacitor 30 is small compared to shaping capacitor 26. The light load the shaping capacitor 30 presents to the Q-S wave generator 15, produces a gently rounded, square wave output with a fall and rise time slightly faster than the heavily integrated output of the R wave generator. The slider of potentiometer 29 is varied to control the amplitude of the output of this shaping circuit. This output is applied through diode 31, which is connected to allow only negative going pulses to be passed through it, to the shaping circuit consisting of capacitor 43 and resistor 42.

The outputs of R wave generator 14 and Q-S wave generator 15, after being shaped and having their amplitudes adjusted, are simultaneously applied through diodes 27 and 31 to the shaping circuit, consisting of shaping capacitor 43 and resistor 42, where they are combined to produce an output voltage at output terminal 47. This combined output voltage is the QRS complex shown in FIG. 1.

R-T interval generator 13, when triggered by the pulse from P-R interval generator 12, produces a negative going pulse output. The duration of this output pulse is continuously variable between 175 and 235 milliseconds. The circuitry used for R-T interval generator 13 is shown in FIG. 4a. At the end of the negative going pulse produced by R-T interval generator 13 the positive rising voltage triggers a T wave generator 17 and a T-U interval generator 16.

The T wave generator 17, when triggered by the pulse from R-T interval generator 13, produces a positive pulse output the duration of which is continuously variable between 150 and 175 milliseconds. The circuitry for the T wave generator 17 is shown in FIG. 4a. The output of T wave generator 17 is applied through a variable resistor 32 to a shaping circiut consisting of a shaping capacitor 34 and a resistor 33 connected in parallel between variable resistor 32 and ground. Variable resistor 32 is used to control the amplitude of the output of this shaping circuit. This output is applied through resistor 35 and a diode 36 to the shaping circuit consisting of shaping capacitor 93 and resistor 32. The voltage output at terminal 47 caused by the pulse passed through diode 36 is the T wave shown in FIG. 1.

T-U interval generator 16 when triggered by the pulse from R-T interval generator 13, produces a negative going pulse output. The duration of this output is continuously variable between 135 and 265 milliseconds. The circuitry used for T-U interval generator 16 is shown in 4a. At the end of the negative pulse produced by T-U interval generator 16, the positive rising voltage triggers a U wave generator 18.

The U wave generator 18 when triggered by the pulse from T-U interval generator 16, produces a positive pulse output the duration of which is continuously variable between 130 and 260 milliseconds. The circuitry for U wave generator 18 is shown by FIG. 4a. The output of U wave generator 18 is applied through a variable resistor 37 to a shaping circuit consisting of shaping capacitor 39 and resistor 38 connected in parallel between variable resistor 37 and ground. Variable resistor 37 is used to control the amplitude of the output of this shaping circuit. This output is applied through a resistor 40 and a diode 41 to the shaping circuit consisting of capacitor 43 and resistor 42. The voltage at output terminal 47 caused by the pulse applied through diode 41 is the U wave shown in FIG. 1.

Figure 1:
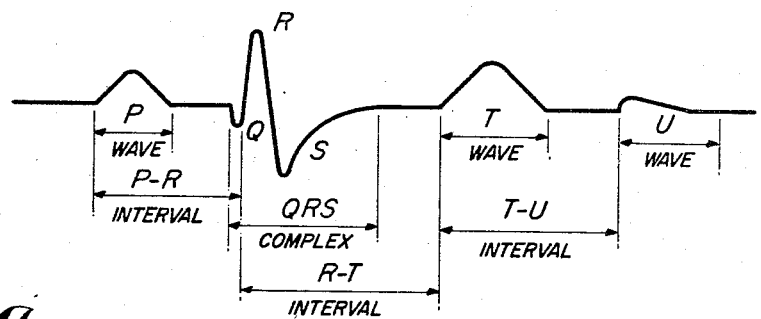
FIG. 1 is a drawing of a standard, idealized EKG wave.

As can be seen from the preceding description of FIG. 2, the pulse from MPG 10 causes a standard EKG idealized wave, shown by FIG. 1, to be generated at output terminal 47. Therefore, every time a pulse is generated by MPG 10 a complete EKG wave is generated at output terminal 47.

Often times, in the trouble shooting of EKG analysis equipment, it is necessary to have available waves which represent muscle noise. Random noise generator 14 generates waves which represent muscle noise and can be applied to capacitor 49 and resistor 45 to output terminal 47. When random noise generator 48 is in operation, switch 46 is in its open position.

Referring now to FIG. 3, a schematic diagram of MPG 10 of FIG. 2 will be described. A unijunction transistor 50, a resistor 51, a variable resistor 52, and a capacitor 53 are connected to form a multivibrator that generates a sawtooth voltage output ot the junction of variable resistor 52 and capacitor 53. The frequency of this sawtooth voltage output is continuously variable between 50 and 140 pulses per minute by adjusting the RC time constant of variable resistor 52 and capacitor 53. This RC time constant adjustment can be made by varying variable resistor 52.

The sawtooth voltage output generated at the junction of variable resistor 52 and capacitor 53 is applied to a pulse inverter and shaper circuit consisting of a capacitor 54, an NPN transistor 56, a resistor 57 and a resistor 58. The base of transistor 56 has a positive bias applied to it through a resistor 55 normally biasing it to saturation. The sawtooth voltage is applied through capacitor 54 to the base of transistor 56 causing pulses to be produced at the collector of transistor 56. Capacitor 54 and the input impedance to transistor 56 determine the pulse width of these produced pulses.

The pulses produced at the collector of transistor 56 are applied through a diode 59 to an emitter follower circuit consisting of an NPN transistor 61 and a resistor 62. Transistor 61 is normally biased to cut off by a negative voltage applied through resistor 60 to its base. The positive pulses which pass through diode 59 drives transistor 61 to saturation, producing a square-wave positive output of 8 milliseconds duration at output terminal 63. The frequency of these pulses produced at output terminal 63 is continuously variable between 50 and 140 pulses per minute by adjusting variable resistor 52.

Referring now to FIGS. 4a and 4b, the circuitry used for all wave and interval generators of FIG. 2 will be described. The circuit consists essentially of an NPN transistor 64 and an NPN transistor 70 connected together to form a monostable multivibrator. The emitter of transistor 64 is connected directly to ground and the collector of transistor 64 is connected through a resistor 65 to a positive power supply. The base of transistor 64 is connected through a resistor 72 to the collector of transistor 70 and is connected through a resistor 71 to a negative power supply. The emitter of transistor 70 is connected directly to ground and the collector of transistor 70 is connected through a resistor 69 to a positive power supply. The base of transistor 70 is connected through a variable resistor 67 and a resistor 68 to a positve power supply and through a capacitor 66 to the collector of transistor 64.

Transistor 64 is normally biased to cut off by a negative voltage applied through resistor 71 to its base; and transistor 70 is normally biased to saturation by charged capacitor 66. When an input positive rising voltage is applied to capacitor 79, a positive voltage is produced at the base of transistor 64 due to the differentiating action of the capacitor. This positive voltage causes transistor 64 to conduct, thereby allowing capacitor 66 to discharge through it. This discharge causes a negative going voltage to be applied to the base of transistor 70 driving it to cut off. The duration that transistor 70 is cut off is the time it takes the negative going voltage applied to its base by capacitor 66 to drop below its cut off voltage. This time is determined by the time constant of capacitor 66, resistor 67, resistor 68 and the impedance of transistor 64. Since this time constant can be varied by variable resistor 67 the duration that transistor 70 is cut off can be controlled by variable resistor 67. A positive voltage appears at the output terminal 73 during the time that transistor 70 is cut off. Each time a positive going voltage is applied to the input a positive pulse is generated at output terminal 73 whose width is determined by the setting of variable resistor 67. Output terminal 73 is designated as the normal output.

If a negative output voltage is required, the normal output is inverted by an inverter circuit consisting of an NPN transistor 76 and a resistor 77. Transistor 76 is normally biased to cut off by a negative voltage applied through a resistor 75 to its base. The normal output is applied through a resistor 74 to the base of transistor 76. When the normal output is positive, transistor 76 conducts resulting in a negative going voltage at an output terminal 78 which is designated as the inverted output. Each time a positive going voltage is applied to the input a negative pulse is generated at output terminal 78 whose width is determined by the setting of variable resistor 67.

FIG. 4b shows a modification of FIG. 4a. This modification shows a diode 80 connected between capacitor 79 and the base of transistor 64. The purpose of diode 80 is to block any negative pulse which might be generated by MPG 10. The modification shown by FIG. 4b is used only on the P wave and the P-R interval generators 11 and 12 of FIG. 2.

The circuit in FIG. 4a with a normal output 83 is used for the P wave, T wave, and U wave generators 11, 14, 17, 18, respectively, of FIG. 2; and the circuit in FIG. 4a with the inverted output 78 is used for the P-R interval, Q-S wave, R-T interval, and T-U interval generators 12, 15, 13, and 16, respectively, of FIG. 2. The variable resistor 67 in FIG. 4a is used to vary the duration of either the normal output or the inverted output.

Figure 5:
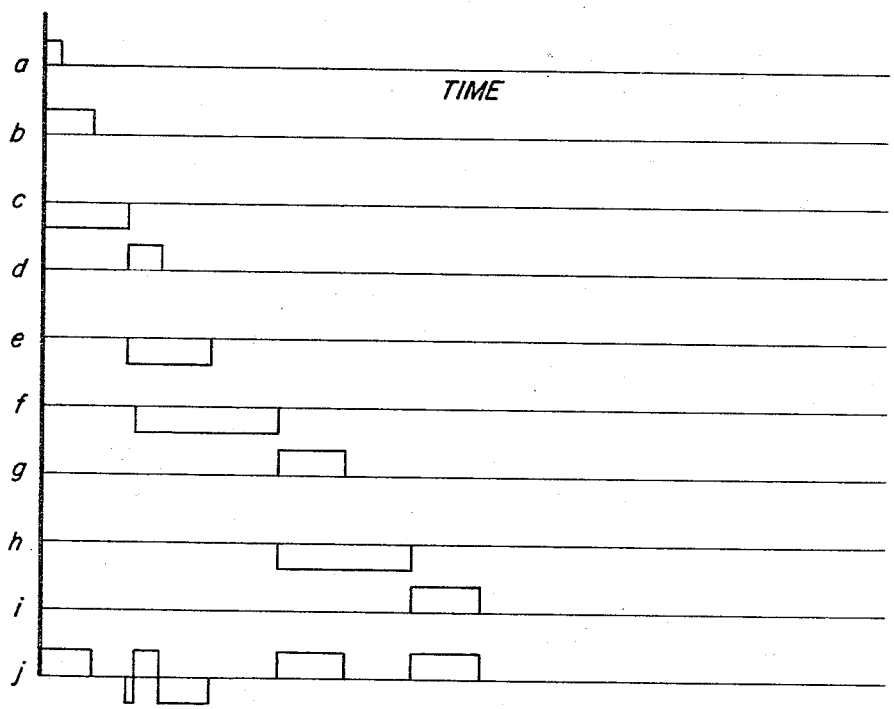
FIG. 5 is a timing diagram of the pulse generated by the generators shown in FIG. 2.

The operation of the simulator disclosed in FIG. 2 will now be described while referring to FIG. 5. Each time a pulse is generated by MPG 10 a complete EKG wave is generated at output terminal 47. A pulse generated by MPG 10 is represented by the pulse shown in FIG. 5a. This pulse is applied to both the P wave generator 11 and the P-R interval generator 12. The P wave generator produces a positive pulse represented by FIG. 5b and the P-R interval generator 12 produces a negative going voltage represented by FIG. 5c.

The negative going voltage produced by P-R interval generator 12 is applied to the R wave generator 14, the Q-S wave generator 15 and the R-T interval generator 13. When this negative going voltage rises, the R wave generator 14 produces a positive pulse represented by FIG. 5d; the Q-S wave generator 15 produces a negative going pulse represented by FIG. 5e; and the R-T interval generator 13 produces a negative going voltage represented by FIG. 5f. The negative going voltage produced by R-T interval generator 13 is applied to T wave generator 17 and to T-U interval generator 16. When this negative going voltage rises T wave generator 17 produces a positive pulse represented by FIG. 5g and T-U interval generator 16 produces a negative going voltage represented by FIG. 5h. The negative going voltage produced by T-U interval generator 16 is applied to U wave generator 18. When this negative going voltage rises U wave generator 18 produces a positive pulse represented by FIG. 5i.

FIG. 5j represents a composite time multiplex of the outputs from the P, R, Q-S, T, and U wave generators, before shaping. The first portion of FIG. 5j is the pulse produced by P wave generator 11. The second portion is a sum of the pulse produced by R wave generator 14 and by Q-S wave generator 15. The transistors 64 and 70 used in the Q-S wave generator 15 have a higher gain and a faster switching time than the transistors 64 and 70 used in the R wave generator 74 so that Q-S wave generator 15 triggers at a time slightly before R wave generator 14 triggers. This accounts for the short duration negative going Q portion of the QRS complex. The positive part of the second portion is caused by the summing of the outputs from the R and Q-S wave generators. The amplitude control networks at the outputs of the R and the Q-R wave generators are adjusted so that a greater part of the R wave generator output than the Q-S wave generator output is applied to output terminal 47. This guarantees the R portion of the QRS complex. The other negative part of the second portion is due to the negative going pulse produced by Q-S wave generator 15 after the positive pulse produced by R wave generator 14 is terminated. This other negative part of the second portion guarantees the S portion of the QRS complex. The third portion is the pulse produced by T wave generator 17 and the fourth portion is the pulse produced by U wave generator 18. After the composite portions represented by FIG. 5j are shaped, an EKG wave, similar to the one shown by FIG. 1, appears at output terminal 47 of FIG. 2.

Obviously numerous modifications or variations of the present invention are possible in light of the above teachings. For example, different circuitry can be used for the master pulse generator and the wave and interval generators. Also these generators can produce pulses having durations and amplitudes different from the particular durations and amplitudes assigned to the generators. It is therefore to be understood that within the scope of the appended claims the invention may be practiced otherwise than as specifically described herein.

What is claimed is:

1. An electronic PQRSTU electrocardiogram simulator for generating electrocardiogram waves at a predetermined frequency comprising: means for generating P waves at said predetermined frequency; means forming QRS complexes at said predetermined frequency and at a first predetermined length of time after the beginning of said P waves; means for generating T waves at said predetermined frequency and at a second predetermined length of time after the ending of said first predetermined length of time; means for generating U waves at said predetermined frequency and at a third predetermined length of time after the ending of said second predetermined length of time wherein the sum of the said first, second, and third predetermined lengths of time is less than the reciprocal of the said predetermined frequency; and means for combining the said generated P waves, QRS complexes, T waves, and U waves to form said electrocardiogram waves.

2. An electronic electrocardiogram simulator as in claim 1 wherein said means forming QRS complexes comprises: means for generating R waves at said predetermined frequency and at said first predetermined length of time after the beginnings of said P waves; means for generating QS waves at said predetermined frequency, which are negative with respect to the R waves, which begin a short length of time before the beginnings of the R waves, and which end a predetermined length of time after the endings of the R waves; and means for combining the waves generated by the said R and QS wave generating means to form the said QRS complexes.

3. An electronic electrocardiogram simulator as in claim 1 wherein means are included for making said predetermined frequency continuously variable within a predetermined range.

4. An electronic electrocardiogram simulator as in claim 1 wherein means are included for making said first, second and third predetermined length of time continuously variable over predetermined ranges.

5. An electronic electrocardiogram simulator as in claim 1 wherein means are included for making the durations of said P waves, QRS complexes, T waves, and U waves continuously variable within predetermined ranges.

6. An electronic electrocardiogram simulator for generating electrocardiogram waves at a predetermined frequency comprising: means for generating a first series of pulses at said predetermined frequency; means for generating a second series of pulses at said predetermined frequency and at a first predetermined length of time after the beginning of said first series of pulses; means for generating a third series of pulses at said predetermined frequency and at a second predetermined length of time after the beginning of the said first series of pulses; means for generating a fourth series of pulses at said predetermined frequency and at a third predetermined length of time after the ending of said first predetermined length of time; means for generating a fifth series of pulses at said predetermined frequency and at a fourth predetermined length of time after the ending of said third predetermined length of time wherein the sum of the said first, third, and fourth predetermined lengths of time is less than the reciprocal of the said predetermined frequency; and means for shaping and combining said five series of generated pulses to form said electrocardiogram waves.

7. An electronic electrocardiogram simulator as in claim 6 wherein the said third series of generated pulses are negative with respect to the other four series of generated pulses.

8. An electronic electrocardiogram simulator as in claim 7 wherein each of the pulses in the said third series of generated pulses begin before and ends after its corresponding pulse in the said second series of generated pulses.

9. An electronic electrocardiogram simulator as in claim 8 wherein the pulses in the said second series of generated pulses after being shaped have greater amplitudes than the pulses in the said third series of generated pulses after being shaped.

10. A heart wave generator for producing a simulated PQRST wave comprising:
    an electronic oscillator,
    a plurality of interconnected passive electronic wave shaping circuits, each energized during each cycle of the oscillator for producing an electrical signal component corresponding to a different one of the component parts of the wave during each cycle of the generator output signal in predetermined phase relationship with the other signals, and
    means combining said signals in an output circuit to produce the simulated PQRST wave.

11. In a heart wave generator for repetitively producing an electrical waveform simulating a PQRST wave comprising: a variable frequency oscillator having an adjustable control means for changing the frequency; a first electronic wave shaping circuit for producing an output signal simulating the P component; a second electronic wave shaping circuit for producing an output signal simulating the Q and S components; a third electronic wave shaping circuit for producing an output signal simulating the R component; a fourth electronic wave shaping circuit for producing an output signal simulating the T component, all of said wave shaping circuits being energized during each cycle of operation of the oscillator to produce their respective signal components in the time phase of the simulated PQRST heart wave; and output means for combining the signals produced by said shaping circuits to produce the composite PQRST wave.

12. An electronic PQRST electrocardiogram simulator for generating electrocardiogram waves at a predetermined frequency comprising: means for generating P waves at said predetermined frequency; means forming QRS complexes at said predetermined frequency and at a first predetermined length of time after the beginning of said P waves; means for generating T waves at said predetermined frequency and at a second predetermined length of time after the ending of said first predetermined length of time wherein the sum of said first and third predetermined lengths of time is less than the reciprocal of said predetermined frequency; and means for combining said P waves, QRS complexes and T waves to form said electrocardiogram waves.

References Cited

UNITED STATES PATENTS 3,055,356   9/1962   Chouinard _____ 128—2.05

ARTHUR GAUSS, *Primary Examiner.*

J. S. HEYMAN, *Assistant Examiner.*